US012758932B2

(12) United States Patent
Pretz et al.

(10) Patent No.: US 12,758,932 B2
(45) Date of Patent: Oct. 13, 2026

(54) CHEMICAL FEED DISTRIBUTORS AND METHODS OF USING THE SAME

(71) Applicant: Dow Global Technologies LLC, Midland, MI (US)

(72) Inventors: Matthew T. Pretz, Freeport, TX (US); Quan Yuan, Lake Jackson, TX (US); Pritish M. Kamat, Lake Jackson, TX (US); Liwei Li, Freeport, TX (US); Lin Luo, Freeport, TX (US)

(73) Assignee: Dow Global Technologies LLC, Midland, MI (US)

(*) Notice: Subject to any disclaimer, the term of this patent is extended or adjusted under 35 U.S.C. 154(b) by 740 days.

(21) Appl. No.: 18/246,968

(22) PCT Filed: Sep. 30, 2021

(86) PCT No.: PCT/US2021/052822
§ 371 (c)(1),
(2) Date: Mar. 28, 2023

(87) PCT Pub. No.: WO2022/072603
PCT Pub. Date: Apr. 7, 2022

(65) Prior Publication Data
US 2023/0364570 A1 Nov. 16, 2023

Related U.S. Application Data

(60) Provisional application No. 63/085,266, filed on Sep. 30, 2020.

(51) Int. Cl.
*B01J 4/00* (2006.01)
*B01J 8/18* (2006.01)
(Continued)

(52) U.S. Cl.
CPC ............... *B01J 4/004* (2013.01); *B01J 4/002* (2013.01); *B01J 8/1809* (2013.01); *B01J 8/1827* (2013.01);
(Continued)

(58) Field of Classification Search
CPC . B01J 4/004; B01J 4/002; B01J 8/1809; B01J 8/1827; B01J 2208/00902;
(Continued)

(56) References Cited

U.S. PATENT DOCUMENTS 2,358,645 A * 9/1944 Kiff .................... A46B 11/0041 401/276
4,535,692 A * 8/1985 Schubert ................. B41F 31/02 101/352.04
(Continued)

FOREIGN PATENT DOCUMENTS

CN 202265546 U * 6/2012
CN 203916613 U 11/2014
(Continued)

OTHER PUBLICATIONS

Chinese Office Action dated Aug. 27, 2025, pertaining to CN Patent Application No. 202180069823.8, 13 pgs.
(Continued)

*Primary Examiner* — Bob Zadeh
(74) *Attorney, Agent, or Firm* — Dinsmore & Shohl LLP

(57) ABSTRACT

According to one or more embodiments, a chemical feed distributor may include a chemical feed inlet and a body. The chemical feed inlet may pass a chemical feed stream into the chemical feed distributor. The body may comprise one or more walls that may define an elongated chemical feed stream flow path and a plurality of chemical feed outlets. The plurality of chemical feed outlets may be spaced on the walls. The plurality of chemical feed outlets may be oper-
(Continued)

able to pass the chemical feed stream out of the chemical feed distributor. The elongated chemical feed stream flow path may comprise an upstream fluid flow path portion and a downstream fluid flow path portion. The walls may be positioned such that the average cross-sectional area of the upstream fluid flow path portion is greater than the average cross-sectional area of the downstream fluid flow path portion.

13 Claims, 7 Drawing Sheets

(51) Int. Cl.
*F23C 10/01* (2006.01)
*F23C 10/22* (2006.01)

(52) U.S. Cl.
CPC .............. *F23C 10/01* (2013.01); *F23C 10/22* (2013.01); *B01J 2208/00902* (2013.01); *B01J 2208/00911* (2013.01)

(58) Field of Classification Search
CPC .. B01J 2208/00911; B01J 8/1818; B01J 8/44; B01J 19/26; B01J 8/085; F23C 10/01; F23C 10/22
See application file for complete search history.

(56) References Cited

U.S. PATENT DOCUMENTS 4,707,278 A * 11/1987 Breyer .................... F16K 25/04 251/118
4,948,568 A * 8/1990 Chessmore .............. B01J 8/085 422/224
5,173,093 A * 12/1992 Johnson ............... B01D 53/504 95/224
5,271,873 A * 12/1993 Nelson ................. B01D 53/504 261/116
5,318,691 A 6/1994 Muldowney
5,620,144 A * 4/1997 Strock .................... B01D 53/79 239/557
6,007,604 A * 12/1999 Risse ..................... B01D 53/79 96/417
6,042,717 A * 3/2000 Radcliffe ............... C10G 11/18 208/158
6,102,377 A * 8/2000 Doughty ................ B01D 53/79 261/117
6,453,992 B1 9/2002 Kim
6,613,133 B2 * 9/2003 Piaskowski .......... B01D 53/185 239/556
9,370,759 B2 6/2016 Pretz et al.
9,889,418 B2 2/2018 Pretz et al.
10,010,840 B2 7/2018 Sprague
2004/0031728 A1 * 2/2004 Sattar ..................... B01J 8/1872 208/158
2006/0102213 A1 * 5/2006 Kopp .................. H10P 72/0414 134/198
2018/0135179 A1 * 5/2018 Ikeuchi ................. C23C 16/402
2023/0364570 A1 * 11/2023 Pretz ....................... F23C 10/01

FOREIGN PATENT DOCUMENTS

CN 205235932 U 5/2016
CN 107661735 A 6/2018
KR 20070014662 A 2/2007
WO WO-9837101 A1 * 8/1998 ........... B05B 7/0433
WO WO-2015153196 A1 * 10/2015 ........... C07C 253/26

OTHER PUBLICATIONS

Japanese Office Action dated Aug. 26, 2025, pertaining to JP Patent Application No. 2023-519080, 10 pgs.
Saudi Arabia Substantive Examination Report dated Nov. 30, 2023, pertaining to SA Patent Application No. 523440086, 15 pgs.
International Search Report and Written Opinion dated Jan. 19, 2022, pertaining to Int'l Patent Application No. PCT/US2021/052822, 10 pgs.
Pistoresi et al. "Numerical study on the improvement of flow distribution uniformity among parallel mini-channels", Chemical Engineering and Processing: Process Intensification, 2015, 95, pp. 63-71.
Shukrie et al. "Air Distributor Designs for Fluidized Bed Combustors: a Review", Engineering, Technology & Applied Science Research, vol. 6, No. 3, 2016, pp. 1029-1034.
Sanchez-Prieto et al. "The effect of temperature on the distributor design in bubbling fluidized beds", Powder Technology 261 (2014) 176-184.
Kuwait Substantive Examination Report dated Feb. 3, 2025, pertaining to KW Patent Application No. Kw/ P/2023/002085, 7 pgs.
Communication pursuant to Article 94(3) dated Feb. 27, 2025, pertaining to EP Patent Application No. 21802857.9, 3 pgs.
Dharaiya et al. "Evaluation of a Tapered Header Configuration to Reduce Flow Maldistribution in Minichannels and Microchannels", Proceedings of the Seventh International ASME Conference on Nanochannels, Microchannels and Minichannels, Jun. 22-24, 2009, Pohang, South Korea, pp. 1-7.
Lackey et al. "Improved Gas Distributor for Coating High-temperature Gas-cooled Reactor Fuel Particles", Oak Ridge National Labratory, 1977; Nuclear tech.
Geldart et al. "The Design of Distributors for Gas-Fluidized-Beds", Powder Technology, 42 (1985) 67-78.
Singapore Written Opinion dated Oct. 15, 2025, pertaining to SG Patent Application No. 11202301994U, 12 pgs.
Brazilian Technical Report dated Feb. 19, 2026, pertaining to BR Patent Application No. BR112023005913.5, 8 pgs.
Chinese Office Action dated Jan. 30, 2026, pertaining to CN Patent Application No. 202180069823.8, 12 pgs.

* cited by examiner

CHEMICAL FEED DISTRIBUTORS AND METHODS OF USING THE SAME

CROSS-REFERENCE TO RELATED APPLICATIONS

The present application is a National Phase Entry under 35 U.S.C. § 371 of International Patent Application No. PCT/US2021/052822 filed Sep. 30, 2021, which claims priority to U.S. Provisional Patent Application No. 63/085,266 filed Sep. 30, 2020, and entitled "CHEMICAL FEED DISTRIBUTORS AND METHODS OF USING THE SAME," the entireties of which are incorporated by reference herein.

BACKGROUND

Field

The present specification generally relates chemical processing and, more specifically, to systems and processes for introducing chemical feed streams.

Technical Background

Gaseous chemicals may be fed into reactors or other vessels through feed distributors. Feed distributors may be utilized to promote balanced distribution of a feed chemical stream into such reactors or vessels. Such distribution of feed chemicals may promote preferred reactions and may maintain mass transport equilibriums in chemical systems.

SUMMARY

In a number of chemical processes, chemical feed streams are fed through chemical feed distributors into a hot environment, such as a reactor or a combustor. These hot environments may elevate the circumferential maximum surface temperature of the chemical feed distributors and may increase the risk of formation of carbonaceous deposits, referred as coking thereafter. This is particularly problematic in fluidized bed vessels, where fluidized solids in the vessel greatly enhances the heat transfer from the hot environment to the feed distributor through radiative and conductive heat transfer. In turn, the coking may create a risk of plugging and flow maldistribution. Accordingly, there is a need for improved chemical feed distributors. It has been found that chemical feed distributors with a generally decreasing cross-sectional area along the length of the chemical feed distributor following the streamwise direction may promote reduced circumferential maximum surface temperatures on the chemical feed distributor. Embodiments of such chemical feed distributors are described herein. One or more embodiments of such chemical feed distributors may maintain a relatively steady circumferential maximum surface temperature along its length and, therefore, reduce the risk of coking and the side effects associated with coking. Embodiments of the present disclosure meet this need by utilizing a chemical feed distributor geometry that maintains a certain heat transfer efficiency along the length of the chemical feed distributor, such that linear velocity may be maintained and stagnant zones within the chemical feed distributor may be reduced.

According to one embodiment, a chemical feed distributor may comprise a chemical feed inlet, a body, and a secondary chemical feed outlet. The chemical feed inlet may pass a chemical feed stream into the chemical feed distributor. The body may comprise one or more walls and a plurality of chemical feed outlets. The one or more walls may define an elongated chemical feed stream flow path. The plurality of chemical feed outlets may be spaced on the walls along at least a portion of the length of the elongated chemical feed stream flow path. The plurality of chemical feed outlets may be operable to pass the chemical feed stream out of the chemical feed distributor and into a vessel. The elongated chemical feed stream flow path defined by the walls may comprise an upstream fluid flow path portion and a downstream fluid flow path portion. The upstream fluid flow path portion may be along the first segment of the distance of the elongated chemical feed stream flow path. The upstream fluid flow path portion may start from the chemical feed inlet. The upstream fluid flow path may end at a halfway point along the length of the elongated chemical feed stream flow path. The downstream fluid flow path portion may be along the second segment of the distance of the elongated chemical feed stream flow path. The downstream fluid flow path portion may begin at the halfway point along the length of the elongated chemical feed stream flow path. The downstream fluid flow path portion may end at the part of a termination point of the elongated chemical feed stream flow path. The walls may be positioned such that the average cross-sectional area of the upstream fluid flow path portion may be greater than the average cross-sectional area of the downstream fluid flow path portion.

According to another embodiment, a method for distributing a chemical feed stream may comprise passing a chemical feed stream through a chemical feed inlet into a chemical feed distributor. The chemical feed distributor may comprise a body. The body may comprise one or more walls and a plurality of chemical feed outlets. The one or more walls may define an elongated chemical feed stream flow path. The plurality of chemical feed outlets may be spaced on the walls along at least a portion of the length of the elongated chemical feed stream flow path. The elongated chemical feed stream flow path defined by the walls may comprise an upstream fluid flow path portion and a downstream fluid flow path portion. The upstream fluid flow path portion may be along the first segment of the distance of the elongated chemical feed stream flow path. The upstream fluid flow path portion may start from the chemical feed inlet. The downstream fluid flow path portion may be along the second segment of the distance of the chemical feed stream flow path. The walls are positioned such that the average cross-sectional area of the upstream fluid flow path portion may be greater than the average cross-sectional area of the downstream fluid flow path portion. The method may further include passing the chemical feed stream along the elongated chemical feed stream flow path and out of the chemical feed distributor and into a vessel through the plurality of chemical feed outlets.

Additional features and advantages will be set forth in the detailed description which follows, and in part will be readily apparent to those skilled in the art from that description or recognized by practicing the embodiments described herein, including the detailed description which follows and the claims.

It is to be understood that both the foregoing general description and the following detailed description describe various embodiments and are intended to provide an overview or framework for understanding the nature and character of the claimed subject matter.

BRIEF DESCRIPTION OF THE DRAWINGS

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Figure 1A:
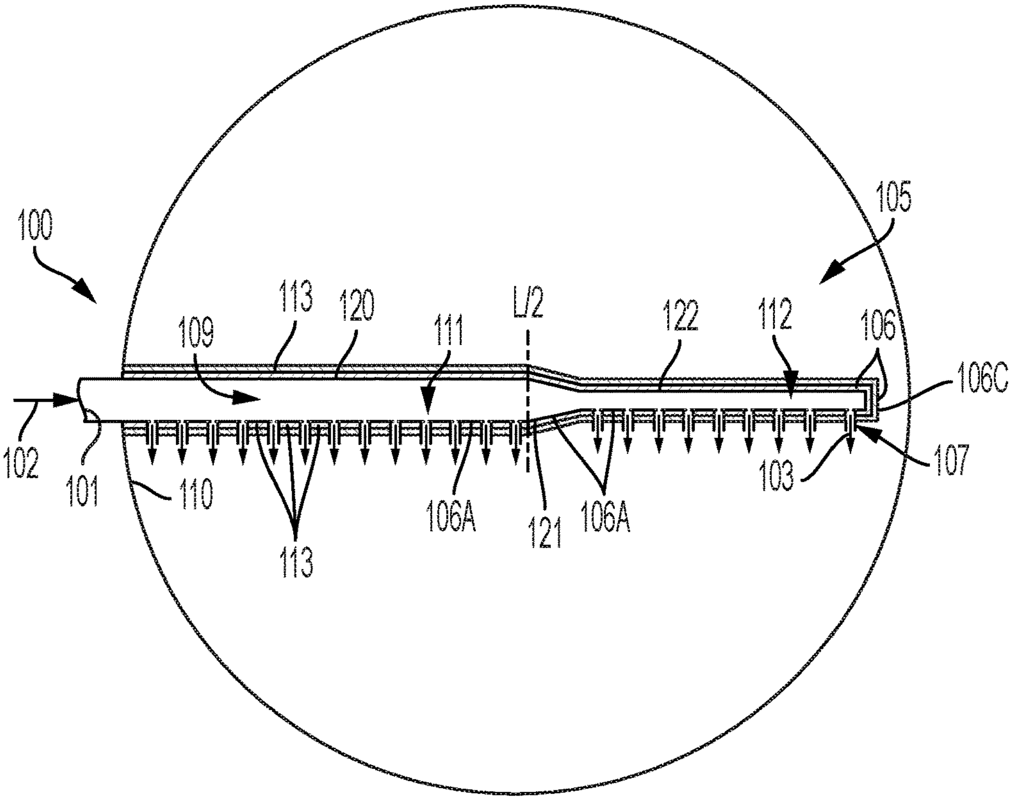
FIG. 1A is a schematic illustration of a cross-sectional overhead view of a chemical feed distributor in accordance with one or more embodiments of the present disclosure.

The present disclosure is directed, according to one or more embodiments described herein, towards chemical feed distributors and methods for using such. Generally, the chemical feed distributors described herein may comprise a chemical feed inlet, a body comprising one or more walls, and a plurality of chemical feed outlets. A chemical feed stream may be passed through the chemical feed inlet into the chemical feed distributor. Generally, the chemical feed distributors described herein comprise a decreasing average cross-sectional area along the length of the chemical feed distributor. As the chemical feed stream passes from the chemical feed distributor through the plurality of chemical feed outlets and into the vessel, the linear gas velocity of the chemical feed stream may be maintained or at least less affected due to the decreasing average cross-sectional area along the length of the chemical feed distributor.

As used throughout the present disclosure, "cross-sectional area" may refer to the area of a two-dimensional shape that is obtained when a three-dimensional object (i.e., a cylinder—is sliced perpendicular to some specified axis at a point. The "average cross-sectional area" may refer to the average of a plurality of cross-sectional areas measured along a certain length of a three-dimensional shape.

Numerous embodiments of chemical feed distributors are described with respect to the appended drawings. However, as presently described, these embodiments may share common themes such as the decreasing average cross-sectional area along the length of the chemical feed distributor. For example, FIGS. 1A, 1B, 1C, 1D, and 1E each depict embodiments that similarly include generally decreasing average cross-sectional area along the length of the chemical feed distributor.

Referring now to FIGS. 1A, 1B, 1C, 1D, and 1E, according to one or more embodiments, the chemical feed distributor 100 may comprise a chemical feed inlet 101. The chemical feed inlet 101 may pass a chemical feed stream 102 into the chemical feed distributor 100. Accordingly, the chemical feed stream 102 may pass through the chemical feed inlet 101 into the chemical feed distributor 100. As described herein, the chemical feed inlet 101 may refer to a place of entry in a vessel 110 that allows the chemical feed distributor 100 and the chemical feed stream 102 within the chemical feed distributor 100 to pass into the vessel 110.

The chemical feed distributor 100 may comprise a body 105. The body 105 may comprise one or more walls 106. The body 105 may also comprise a plurality of chemical feed outlets 107. As described herein, the plurality of chemical feed outlets 107 may be openings in the or more walls 106 of the body 105 and may provide a passage for the chemical feed stream 102 from the chemical feed distributor 100 to the vessel 110. In embodiments, the plurality of chemical feed outlets 107 may be arranged in a singular row along the chemical feed distributor. In other embodiments, as shown in FIG. 1B, the plurality of chemical feed outlets 107 may be arrange in an alternating position along the chemical feed distributor 100, such as two rows. It is contemplated that the chemical feed outlets 107 may be arrange in any configuration along the chemical feed distributor 100. The plurality of chemical feed outlets 107 may comprise orifices 107A at the start of each chemical feed outlet 107 to create pressure drop and create even distribution. The plurality of chemical feed outlets 107 may also comprise diffusers 107B to slow the superficial gas velocity passing through the plurality of chemical feed outlets 107 so as not to cause catalyst attrition or chemical feed distributor 100 damage. The diffusers 107B may permit the gas velocity to be in a range from 50 feet per second (ft/sec) to 300 ft/sec.

The one or more walls 106 may define an elongated chemical feed stream flow path 109. The plurality of chemical feed outlets 107 may be spaced along at least a portion of the length of the elongated chemical feed stream flow path 109. Individual ones of the plurality of chemical feed outlets 107 may be operable to pass portions 103 of the chemical feed stream 102 out of the chemical feed distributor 100 and into a vessel 110. The total flow rate of the chemical feed stream 102 entering the chemical feed distributor 100 may be equal to the flow rate of the portions 103 of the chemical feed stream 102 passing through individual ones of the plurality of chemical feed outlets 107 and into the vessel 110.

During operation, the chemical feed stream 102 may be fed at a relatively cool temperature compared to the temperature inside the vessel 110. According to one or more embodiments, the differential between the temperature of the chemical feed stream 102 and the temperature inside the vessel 110 may be greater than 300° C., such as greater than 350° C., greater than 400° C., greater than 450° C., greater than 500° C., greater than 550° C., greater than 600° C., or greater than 650° C. In embodiments, the temperature inside the vessel 110 may be greater than 500° C. and the temperature of the chemical feed stream 102 may be lower than the temperature inside the vessel. During operation, the temperature inside the vessel 110 may begin to heat the chemical feed distributor 100 and, therefore, may elevate the circumferential maximum surface temperature of the chemical feed distributor 100. Circumferential maximum surface temperature may refer to the highest surface temperature throughout the chemical feed distributor 100. This may also elevate the temperature of the chemical feed stream 102 within the chemical feed distributor 100. If the circumferential maximum surface temperature of the chemical feed distributor 100 or the temperature of the chemical feed stream 102 inside the chemical feed distributor 100 increases too much, the chemical feed stream 102 may begin to deposit coke on the chemical feed distributor 100. When coke deposits on the chemical feed distributor 100, plugging may begin at the plurality of chemical feed outlets 107, which could result in flow maldistribution, which may result in operational issues. As used in the present disclosure, "flow maldistribution" may refer to differences in uniform flow distribution between the plurality of chemical feed outlets 107.

According to one or more embodiments of the present disclosure, the elongated chemical feed stream flow path 109 may be defined by the one or more walls 106. The elongated chemical feed stream flow path 109 may comprise an upstream fluid flow path portion 111 and a downstream fluid flow path portion 112. The upstream fluid flow path portion 111 may be along the first segment of the distance of the elongated chemical feed stream flow path 109. The upstream fluid flow path portion 111 may start from the chemical feed inlet 101 and may continue to the downstream fluid flow path portion 112. Similarly, the downstream fluid flow path portion 112 may be along the second segment of the distance of the elongated chemical feed stream flow path 109. The downstream fluid flow path portion 112 may start from the end of the upstream fluid flow path portion 111 and may continue to the terminal point of the chemical feed distributor 100. The terminal point may be equivalent to an end wall 106C. The end wall 106C may be most downstream on the body 105 of the chemical feed distributor 100. In FIGS. 1A-D, "L/2" may denote where the upstream fluid flow path portion 111 and the downstream fluid flow path portion 112 meet.

As used in this disclosure, the terms "upstream" and "downstream" may refer to the relative positioning of elements with respect to the direction of flow of the process streams. A first element of a system may be considered "upstream" of a second element if process streams flowing through the system encounter the first element before encountering the second element. Likewise, a second element may be considered "downstream" of the first element if the process streams flowing through the system encounter the first element before encountering the second element.

The walls 106 of the chemical feed distributor 100 may be positioned such that the average cross-sectional area of the upstream fluid flow path portion 111 is greater than the average cross-sectional area of the downstream fluid flow path portion 112. In embodiments, the minimum cross-sectional area of the elongated chemical feed stream flow path 109 may be less than 50% of the maximum cross-sectional area of the elongated chemical feed stream flow path 109. For example, the minimum cross-sectional area of the elongated chemical feed stream flow path 109 may be less than 40%, less than 30%, or less than 20% of the maximum cross-sectional area of the elongated chemical feed stream flow path 109. The minimum cross-sectional area of the elongated chemical feed stream flow path 109 may be from 1% to 30%, from 5% to 25%, or from 10% to 20% of the maximum cross-sectional area of the elongated chemical feed stream flow path 109.

Positioning the walls 106 such that the average cross-sectional area of the upstream fluid flow path portion 111 is greater than the average cross-sectional area of the downstream fluid flow path portion 112 may decrease the risk of coking, and, in turn, the risk of plugging and flow maldistribution. Without being bound to any particular theory, the linear gas velocity of the chemical feed stream 102 in the chemical feed distributor 100 may be better maintained as the average cross-sectional area of the elongated chemical feed stream flow path 109 decreases along the length of the chemical feed distributor 100. If the cross-sectional area of the elongated chemical feed stream flow path 109 were kept constant along the length of the chemical feed distributor 100, as portions 103 of the chemical feed stream 102 passes through the plurality of chemical feed outlets 107 and into the vessel 110, the volumetric flow rate of the chemical feed stream 102 would decrease. Such a decrease of the volumetric flow rate of the chemical feed stream 102 may result in an undesirable change of Reynolds number. Such a decrease of the volumetric flow rate of the chemical feed stream 102 may result in a reduced linear gas velocity, which may further cause the heat transfer rate of the one or more walls 106 of the chemical feed distributor 100 to decrease. This undesirable change of Reynolds number and the decreased heat transfer rate of the one or more walls 106 of the chemical feed distributor 100 may, in turn, lead to coking of the chemical feed stream 102 in the chemical feed distributor 100. As detailed above, coking may lead to plugging and flow maldistribution. Conversely, when the average cross-sectional area of the upstream fluid flow path portion 111 is greater than the average cross-sectional area of the downstream fluid flow path portion 112, the linear gas velocity of the chemical feed stream 102 may be better maintained along the length of the chemical feed distributor 100. This may result in a lower than desirable Reynolds number and/or stagnation in the chemical feed distributor 100 and decrease coking and the side effects associated with coking. That is, maintaining a desirable Reynolds number may effectively minimize coking, and, in turn, plugging of the plurality of chemical feed outlets 107 and flow maldistribution.

According to one or more embodiments, the chemical feed outlet 107 that is most downstream relative to the elongated chemical feed stream flow path 109 may be positioned within two inches of an end wall 106C. The end wall 106C may define a termination point of the elongated chemical feed stream flow path 109. In embodiments, the chemical feed outlet 107 that is most downstream relative to the elongated chemical feed stream flow path 109 may be positioned within a distance equal to the inner diameter of the elongated chemical feed stream flow path 109 at the termination point of the elongated chemical feed stream flow path 109. It is contemplated that one or more chemical feed outlets 107 may be positioned such that no individual chemical feed outlet 107 is more downstream than the other. In such a case, the measurement may be taken from either one of the one or more chemical feed outlets 107 that are most downstream relative to the elongated chemical feed steam flow path 109. For example, the chemical feed outlet 107 that is most downstream relative to the elongated chemical feed stream flow path 109 may be positioned within a distance equal to half of the inner diameter of the elongated chemical feed stream flow path 109 at the termination point of the elongated chemical feed stream flow path 109. Any remaining amount of the chemical feed stream 102 may be passed out of the chemical feed outlet 107 that is most downstream relative to the elongated chemical feed stream flow path 109, as detailed above.

As used in this disclosure, a "chemical feed" may refer to any process feed stream or fuel gas, such as, but not limited to, methane, natural gas, ethane, propane, hydrogen, or any gas that comprises energy value upon combustion.

Additionally, as used in this disclosure, a "vessel" may refer to a hollow container for holding a gas or solids, such as, a reactor or combustor in which one or more chemical reactions may occur between one or more reactants optionally in the presence of one or more catalysts. In embodiments, the vessel 110 may have a solid particle volume fraction up to 55 vol. % and the superficial velocity of the gas in the vessel 110 may be higher than the minimum fluidization velocity of the solid particles.

Additionally, as used in the present disclosure "coking" may refer to the formation of carbonaceous deposits, or coke. "Plugging" may refer to an accumulation of coke such that a passage or port may be partially restricted or completely blocked.

Figure 1B:
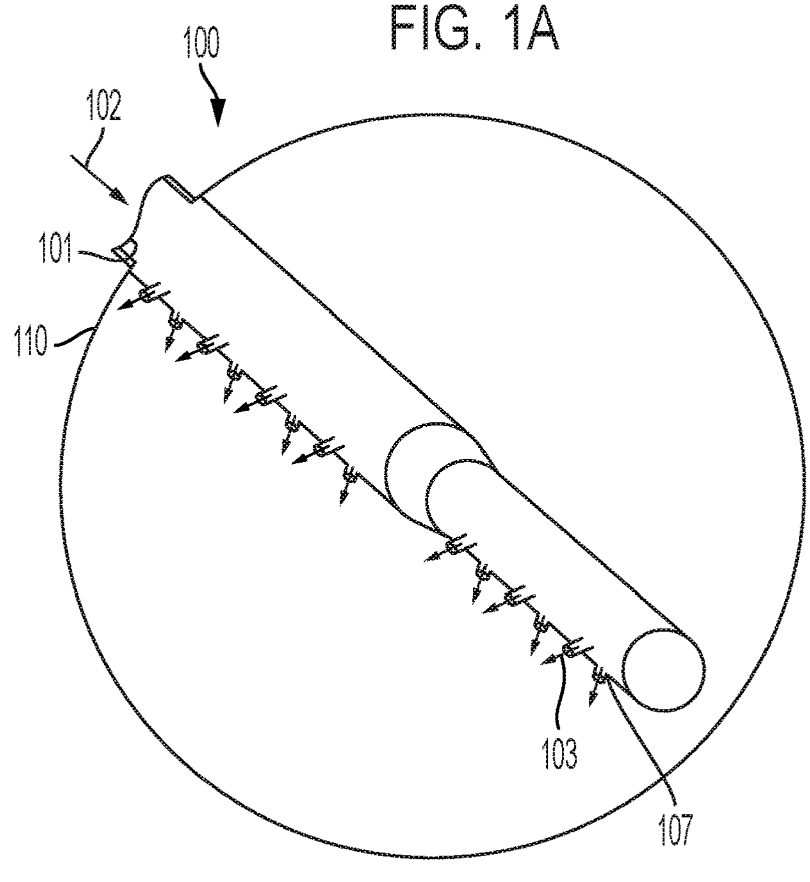
FIG. 1B is a schematic illustration of an perspective view of a first embodiment of a chemical feed distributor in accordance with one or more embodiments of the present disclosure.

Referring to FIGS. 1A and 1B, in some embodiments, the one or more walls 106 may comprise a first wall 106A and an end wall 106C. The first wall 106A may define a first pipe 120, a frustum shaped transition section 121, and a second pipe 122. As used herein, a pipe may comprise any shape. For example, a pipe may have a cross-sectional shape that is circular, cylindrical, oval, rectangular, or any other geometric shape The first pipe 120 may be in contact with and downstream from the chemical feed inlet 101. The frustum shaped transition section 121 may be in contact with and downstream from the first pipe 120. The second pipe 122 may be in contact with and downstream from the frustum shaped transition section 121. Together, the first pipe 120, a frustum shaped transition section 121, and the second pipe 122 may define the elongated chemical feed stream flow path 109. The plurality of chemical feed outlets 107, as detailed above, may be spaced along a portion of the length of the elongated chemical feed stream flow path 109, or, alternatively, along a portion of the first pipe 120, the frustum shaped transition section 121, and the second pipe 122. Therefore, the chemical feed stream 102, after entering the chemical feed distributor 100 via the chemical feed inlet 101, may pass along the elongated chemical feed stream flow path 109 and may pass out of the chemical feed distributor 100 via the plurality of chemical feed outlets 107.

Figure 1C:
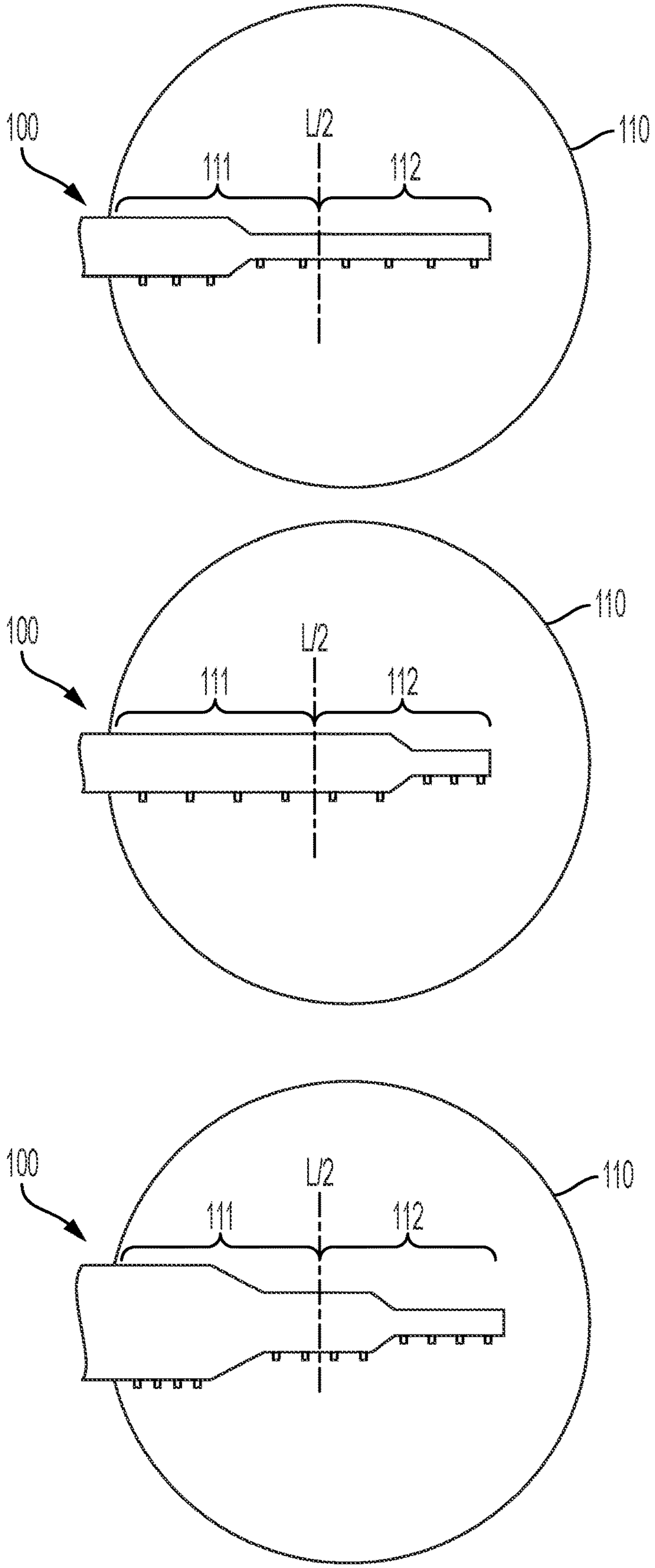
FIG. 1C is a schematic illustration of various chemical feed distributors in accordance with one or more embodiments of the present disclosure.

While FIGS. 1A and 1B depict a chemical feed distributor 100 comprising first pipe 120, a frustum shaped transition section 121, and a second pipe 122, it is contemplated that any number of pipes (i.e., pipe segments) and frustum shaped transition sections may be utilized. For example, the chemical feed distributor 100 may comprise a plurality of pipe segments, such as, three, four, five, six, and so on pipe segments with frustum shaped transition sections between each of the pipe segments. Further, it should be noted that each pipe segment need not comprise the exact same length. That is individual shaped pipe segments may be shorter or longer than other individual shaped pipe segments. While the first pipe 120 and second pipe 122 of FIGS. 1A and 1B may be approximately the same length, it is contemplated that the first pipe 120 and second pipe 122 may be different lengths. For example, now referring to FIG. 1C, various embodiments of chemical feed distributors 100 with various pipe segment arrangements are depicted. In some embodiments, the first pipe 120 may be shorter than the second pipe 122. In other embodiments, the first pipe 120 may be longer than the second pipe 122. Further, in some embodiments, the chemical feed distributor 100 may comprise more than two pipe segments (i.e., a first pipe 120 and a second pipe 122). That is, as shown in FIG. 1C, the chemical feed distributor may comprise, for example, three pipe segments.

Again referring to FIGS. 1A and 1B, the center axis of the first pipe 120 and the center axis of the second pipe 122 are collinear may be parallel. That is, the walls 106 of first pipe 120 and the walls 106 of the second pipe 122 may form concentric circles. In such an embodiment, the frustum shaped transition section 121 may comprise an order of the rotational symmetry of 360. In other embodiments, the center axis of the first pipe 120 and the center axis of the second pipe 122 may be non-parallel. That is, the walls 106 of first pipe 120 and the walls 106 of the second pipe 122 may form eccentric circles. In embodiments, the frustum shaped transition section 121 may be shaped such that the first shaped pipe 120 and the second shaped pipe 122 form a "U" or a "V".

During operation, according to the embodiment of FIGS. 1A and 1B, the chemical feed stream 102 may enter the chemical feed distributor 100 via the chemical feed inlet 101. The chemical feed stream 102 may be passed through the first pipe 120, the frustum shaped transition section 121, and the second pipe 122. As detailed above, the elongated chemical feed stream flow path 109 may comprise the upstream fluid flow path portion 111 and the downstream fluid flow path portion 112. As the chemical feed stream 102 is passed along the elongated chemical feed stream flow path 109, portions 103 of the chemical feed stream 102 may exit the chemical feed distributor 100 through the plurality of chemical feed outlets 107. As portions 103 of the chemical feed stream 102 exit the chemical feed distributor 100 through the plurality of chemical feed outlets 107, the linear gas velocity of the chemical feed stream 102 may decrease. However, as the average cross-sectional area along the elongated chemical feed stream flow path 109 decreases, the linear gas velocity of the chemical feed stream 102 may be maintained or, alternatively, the decrease in the linear gas velocity of the chemical feed stream 102 may be minimized. By maintaining the linear gas velocity or minimizing the decrease in the linear gas velocity, stagnation of the chemical feed stream 102 within the chemical feed distributor 100 may be decreased. By decreasing stagnation of the chemical feed stream 102, coking, and the side effects associated with coking, may also be decreased.

Figure 1D:
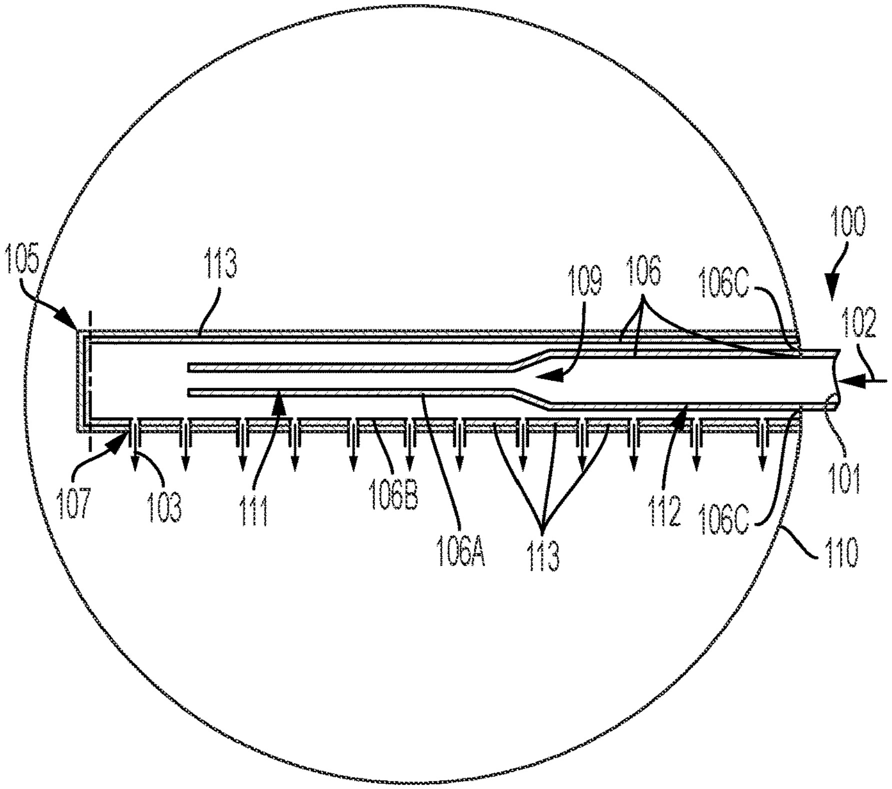
FIG. 1D is a schematic illustration of a cross-sectional overhead view of a second embodiment of a chemical feed distributor in accordance with one or more embodiments of the present disclosure.

Now referring to FIG. 1D, according to one or more embodiments, the one or more walls 106 may comprise a first wall 106A and a second wall 106B. The second wall 106B may comprise inner diameter larger than or equal to the first wall 106A. The second wall 106B may surround the first wall 106A. An interior surface of first wall 106A may define the upstream fluid flow path portion 111. An exterior surface of the first wall 106A and an interior surface of the second wall 106B may define the downstream fluid flow path portion 112. While the second wall 106B may comprise inner diameter larger than or equal to the first wall 106A, the downstream fluid flow path portion 112 may still comprise an average cross-sectional area less than the upstream fluid flow path portion 111. That is, while the average cross-sectional area of the second wall 106B may be greater than the first wall 106A, the downstream fluid flow path portion 112 may only be defined by the area not occupied by the upstream fluid flow path portion 111.

Still referring to FIG. 1D, the downstream portion 131 of the elongated chemical feed stream flow path 109 may surround the upstream portion 130 of the elongated chemical feed stream flow path 109. The first wall 106A may define a first pipe 120. The second wall 106B may define a second pipe 122. The first pipe 120 and the second pipe 122 may comprise the same shaped pipes or may comprise different shaped pipes. The first wall 106A and the second wall 106B may form a co-axial geometry. It is also contemplated that the first wall 106A and the second wall 106B may form an eccentric geometry. The first wall 106A defining upstream portion 130 of the elongated chemical feed stream flow path 109 may be hermetic. That is, the chemical feed stream 102 may not pass through the first wall 106A except where the first wall 106A ends and the upstream portion 130 of the elongated chemical feed stream flow path 109 contacts the downstream portion 131 of the elongated chemical feed stream flow path 109. As shown in FIG. 1D, the first wall 106A may be a shorter length than the second wall 106B such that the elongated chemical feed stream flow path 109 may be continuous through the body 105 of the chemical feed distributor 100.

During operation, according to the embodiment of FIG. 1D, the chemical feed stream 102 may enter the chemical feed distributor 100 via the chemical feed inlet 101. The chemical feed stream 102 may be passed through upstream portion 130 of the elongated chemical feed stream flow path 109. As shown in FIG. 1D, the first wall 106A defining the upstream portion 130 of the elongated chemical feed stream flow path 109 may terminate before the end of the body 105 opposite the chemical feed inlet 101. This may allow the chemical feed stream 102 to continue from the upstream portion 130 of the elongated chemical feed stream flow path 109 to the downstream portion 131 of the elongated chemical feed stream flow path 109. As the chemical feed stream 102 travels along the downstream portion 131 of the elongated chemical feed stream flow path 109, the chemical feed stream 102 may travel back towards the chemical feed inlet 101, but on the outside of the first wall 106A defining the upstream portion 130 of the elongated chemical feed stream flow path 109. As the chemical feed stream 102 travels along the downstream portion of the elongated chemical feed stream flow path 109, portions 103 of the chemical feed stream 102 may exit the chemical feed distributor 100 through the plurality of chemical feed outlets 107. As portions 103 of the chemical feed stream 102 exit the chemical feed distributor 100 through the plurality of chemical feed outlets 107, the linear gas velocity of the chemical feed stream 102 may decrease. However, as the average cross-sectional area along the downstream portion 131 of the elongated chemical feed stream flow path 109 decreases, the linear gas velocity of the chemical feed stream 102 may be maintained or, alternatively, the decrease in the linear gas velocity of the chemical feed stream 102 may be minimized. By maintaining the linear gas velocity or minimizing the decrease in the linear gas velocity, stagnation of the chemical feed stream 102 within the chemical feed distributor 100 may be decreased. By decreasing stagnation of the chemical feed stream 102, coking, and the side effects associated with coking, may also be decreased.

Figure 1E:
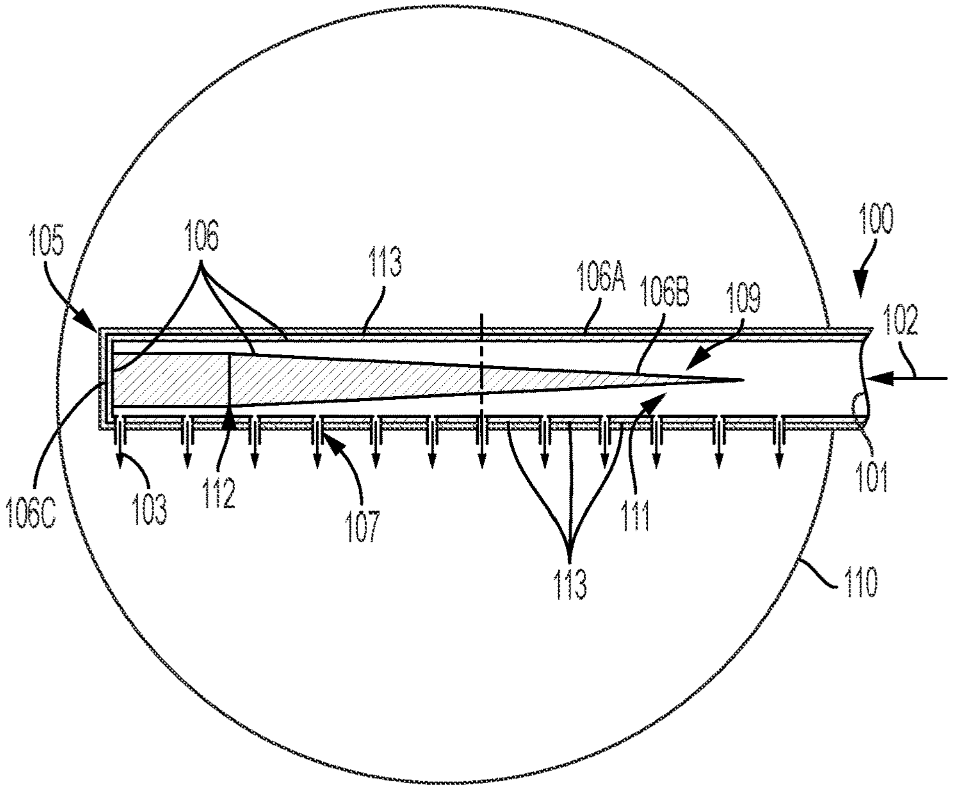
FIG. 1E is a schematic illustration of a cross-sectional overhead view of a third embodiment of a chemical feed distributor in accordance with one or more embodiments of the present disclosure.
Figure 1F:
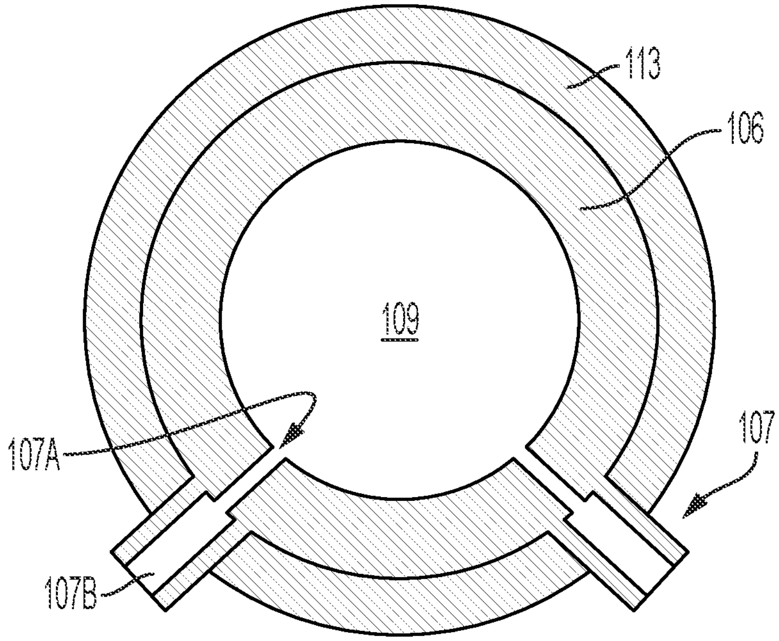
FIG. 1F is a schematic illustration of a cross-sectional view of chemical feed outlets of a chemical feed distributor in accordance with one or more embodiments of the present disclosure.

Now referring to FIG. 1E, according to one or more embodiments, the chemical feed distributor 100 may comprise a chemical feed stream guide 108 inside the body 105 of the chemical feed distributor 100. The chemical feed stream guide 108 may be in contact with the end wall 106C of the body 105 of the chemical feed distributor 100. The chemical feed stream guide 108 may decrease the cross-sectional area along a portion of the elongated chemical feed stream flow path 109 along the length of the chemical feed distributor 100. In embodiments with the chemical feed stream guide 108, the body 105 of the chemical feed distributor 100 may be a constant diameter along the length of the chemical feed distributor 100. The chemical feed stream guide 108 may serve to decrease the cross-sectional area along the length of the chemical feed distributor 100 without varying the diameter of the body 105 of the chemical feed distributor 100. However, it is contemplated that, according to one or more embodiments, the body 105 of the chemical feed distributor 100 may feature both a decreasing cross-sectional area along of a portion of the body 105 of the chemical feed distributor 100 as well as a chemical feed stream guide 108 inside the body 105 of the chemical feed distributor 100.

Still referring to FIG. 1E, the average cross-sectional area of the chemical feed stream guide 108 may be greater in the downstream fluid flow path portion 112 than in the upstream fluid flow path portion 111. It is also contemplated that, in some embodiments, the chemical feed stream guide 108 may only be located in the downstream fluid flow path portion 112 of the chemical feed distributor 100. That is, in some embodiments, the chemical feed stream guide 108 may not extend from the downstream fluid flow path portion 112 to the upstream fluid flow path portion 111. According to one or more embodiments, the chemical feed stream guide 108 may comprise any geometry. For example, the chemical feed stream guide 108 may comprise one or more of a conical shape, a cylindrical shape, a rectangular shape, a spherical shape, or combinations thereof.

During operation, according to the embodiment of FIG. 1E, the chemical feed stream 102 may enter the chemical feed distributor 100 via the chemical feed inlet 101. The chemical feed stream 102 may be passed along the elongated chemical feed stream flow path 109. As the chemical feed stream 102 is passed along the elongated chemical feed stream flow path 109, portions 103 of the chemical feed stream 102 may exit the chemical feed distributor 100 through the plurality of chemical feed outlets 107. Again, the linear gas velocity of the chemical feed stream 102 may decrease as portions 103 of the chemical feed stream 102 exit the chemical feed distributor 100 through the plurality of chemical feed outlets 107. However, the chemical feed stream guide 108 may decrease the cross-sectional area along the length of the chemical feed distributor 100. As the average cross-sectional area along the elongated chemical feed stream flow path 109 decreases, the linear gas velocity of the chemical feed stream 102 may be maintained or, alternatively, the decrease in the linear gas velocity of the chemical feed stream 102 may be minimized. By maintaining the linear gas velocity or minimizing the decrease in the linear gas velocity, coking, and the side effects associated with coking, may also be decreased.

Referring now to FIGS. 1A, 1B, 1C, 1D, and 1E, the chemical feed distributor 100 may comprise a refractory material 113 lining the walls 106 of the body 105. As used herein, a refractory material 113 is a material that may be resistant to decomposition by heat, pressure, or chemical attack, and may retain strength and form at high temperatures. Oxides of aluminum, silicon, magnesium, and calcium may be common materials used in the manufacturing of refractory materials. The refractory material 113 may be a thermal insulator with thermal conductivity less than approximately 14 W/m-K. According to one or more embodiments, the thickness of refractory material 113 lining the walls 106 defining the upstream fluid flow path portion 111 and the downstream fluid flow path portion 112 of the elongated chemical feed stream flow path 109 may differ. For example, the thickness of refractory material 113 lining the downstream fluid flow path portion 112 of the elongated chemical feed stream flow path 109 may be greater than the thickness of refractory material 113 lining the walls 106 defining the upstream fluid flow path portion 111 of the elongated chemical feed stream flow path 109.

Figure 2:
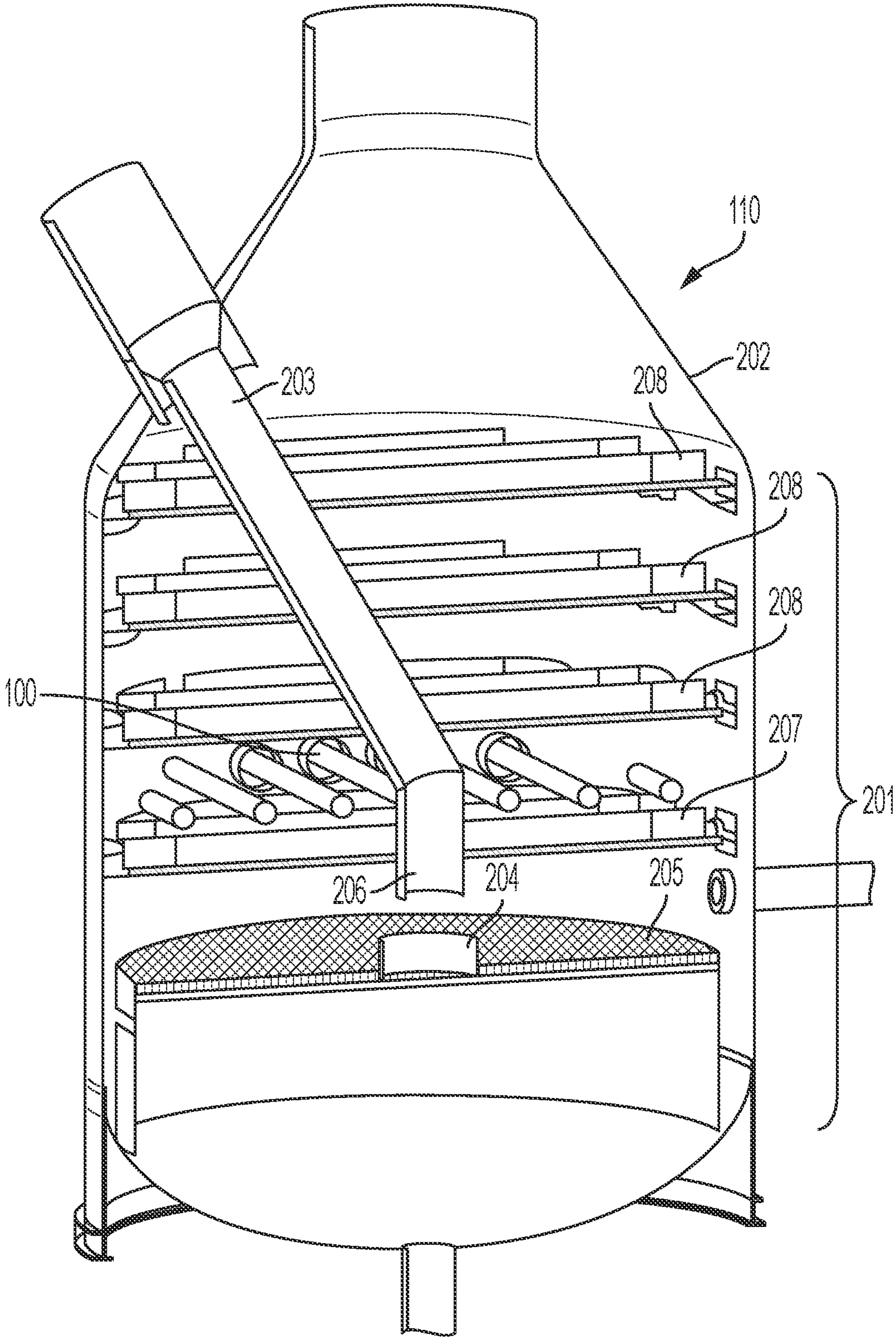
FIG. 2 is a schematic cutaway view of a vessel in accordance with one or more embodiments of the present disclosure.

Referring to FIG. 2, a schematic cutaway view of an embodiment of a vessel 110 is shown. FIG. 2 shows a vessel 110 used as a fluidized fuel gas combustor system for a catalytic dehydrogenation process. However, as detailed herein, the chemical feed distributor 100 may be employed in a variety of vessels 110. Referring again to FIG. 2, the vessel 110 may include a lower portion 201 generally in the shape of a cylinder and an upper portion comprising a frustum 202. The angle between the frustum 202 and an internal horizontal imaginary line drawn at the intersection of the frustum 202 and the lower portion 201 may range from 10 to 80 degrees. All individual values and subranges from 10 to 80 degrees are included and disclosed herein; for example the angle between the tubular and frustum 202 components can range from a lower limit of 10, 40 or 60 degrees to an upper limit of 30, 50, 70 or 80 degrees. For example, the angle can be from 10 to 80 degrees, or in the alternative, from 30 to 60 degrees, or in the alternative, from 10 to 50 degrees, or in the alternative, from 40 to 80 degrees. Furthermore, in alternative embodiments, the angle can change along the height of the frustum 202, either continuously or discontinuously. In some embodiments, the vessel 110 may be, or may not be, lined with a refractory material.

Spent or partially deactivated catalyst may enter the vessel 110 through downcomer 203. In alternative configurations, the spent or partially deactivated catalyst may enter the vessel 110 from a side inlet or from a bottom feed, passing upward through the air distributor as described in U.S. Pat. No. 9,370,759 B2. The used catalyst impinges upon and is distributed by splash guard 204. The vessel 110 may further includes air distributors 205 which are located at or slightly below the height of the splash guard 204. Above the air distributors 205 and the outlet 206 of downcomer 203 may be a grid 207. Above the grid 207 may be a plurality of chemical feed distributors 100. One or more additional grids 208 may be positioned within the vessel 110 above the chemical feed distributors 100. In embodiments, the chemical feed distributors 100 may enter the vessel 110 and traverse substantially across the vessel 110 as described in U.S. patent application Ser. No. 14/868,507.

As previously described herein, according to one or more embodiments, the method for distributing the chemical feed stream 102 may comprise passing the chemical feed stream 102 through the chemical feed inlet 101 into the chemical feed distributor 100. The method may further comprise passing the chemical feed stream 102 along the elongated chemical feed stream flow path 109 and out of the chemical feed distributor 100 and into the vessel 110 through the plurality of chemical feed outlets 107. As described according to the various embodiments above, the chemical feed distributor 100 may comprise the body 105. The body 105 may comprise one or more walls 106 and the plurality of chemical feed outlets 107. The one or more walls 106 may define the elongated chemical feed stream flow path 109. The plurality of chemical feed outlets 107 may be spaced on the walls 106 along at least a portion of the length of the elongated chemical feed stream flow path 109. The elongated chemical feed stream flow path 109 defined by the walls 106 may comprise the upstream fluid flow path portion 111 and the downstream fluid flow path portion 112. The upstream fluid flow path portion 111 may be along the first segment of the distance of the elongated chemical feed stream flow path 109 starting from the chemical feed inlet 101. The downstream fluid flow path portion 112 may be along the second segment of the distance of the elongated chemical feed stream flow path 109. The walls 106 may be positioned such that the average cross-sectional area of the upstream fluid flow path portion 111 may be greater than the average cross-sectional area of the downstream fluid flow path portion 112.

According to one or more embodiments, the temperature inside the vessel 110 may be greater than 650° C. and the circumferential maximum surface temperature of the chemical feed distributor 100 may not exceed the temperature inside the vessel 110. In other embodiments, the temperature inside the vessel 110 may be greater than 650° C. and the circumferential maximum surface temperature of the chemical feed distributor 100 may not exceed 500° C.

As further discussed below, FIGS. 3A, 3B, and 4 further demonstrate the circumferential maximum surface temperature and peak surface temperature of the chemical feed distributor 100 according to embodiments described herein. FIG. 4 compares embodiments where the average cross-sectional area of the upstream fluid flow path portion 111 is greater than the average cross-sectional area of the downstream fluid flow path portion 112 (402 in FIG. 4) to chemical feed distributors 100 where the average cross-sectional area of the upstream fluid flow path portion 111 is equal to the average cross-sectional area of the downstream fluid flow path portion 112 (401 in FIG. 4).

As previously described herein, the chemical feed distributor 100 of the embodiments herein may reduce the risk of coking. As coking may create a risk of plugging and flow maldistribution, the chemical feed distributor 100 of the embodiments herein may reduce the risk of plugging and flow maldistribution. Flow maldistribution may also be caused by the heating up of the chemical feed stream 102 within the chemical feed distributor 100, which may be referred to as thermally-induced flow maldistribution. As the temperature of the chemical feed stream 102 within the chemical feed distributor 100 increases, the density of the chemical feed stream 102 may decrease. Mass flow rate is proportional to the square root of the gas density. If the density of the chemical feed stream 102 decreases along a length of the chemical feed distributor 100, the mass flow rate may also decrease along the length of the chemical feed distributor 100. However, according to one or more embodiments of the present disclosure, the temperature increase of the chemical feed stream 102 may be lower, which in turn decreases any change in the density of the chemical feed stream 102. Therefore, the thermally-induced flow maldistribution may be decreased.

In embodiments of the present disclosure, the relative reduction in flow maldistribution (including thermally-induced flow maldistribution) may be less than ±30.0%, such as less than ±27.5%, less than 25.0%, less than 22.5%, less than 20.0%, less than 17.5%, less than ±15.0%, less than ±12.5%, less than ±10.0%, less than ±7.5%, less than ±7.0%, less than ±6.5%, less than ±6.0%, less than ±5.5%, less than ±5.0%, less than ±4.5%, less than ±4.0%, less than ±3.5%, less than ±3.0%, or less than ±3.0% as compared to an embodiment where the average cross-sectional area of the upstream fluid flow path portion 111 is equal to the average cross-sectional area of the downstream fluid flow path portion 112. Flow maldistribution may be determined by using a computational fluid dynamics (CFD) program ANSYS Fluent® which can numerically predict the 3D compressible flow and conjugated heat transfer in the system following the first principle mass, momentum and energy conservation laws. The flow maldistribution is simply the deviation from a perfect average mass distribution at various points along the distributor.

Figure 5:
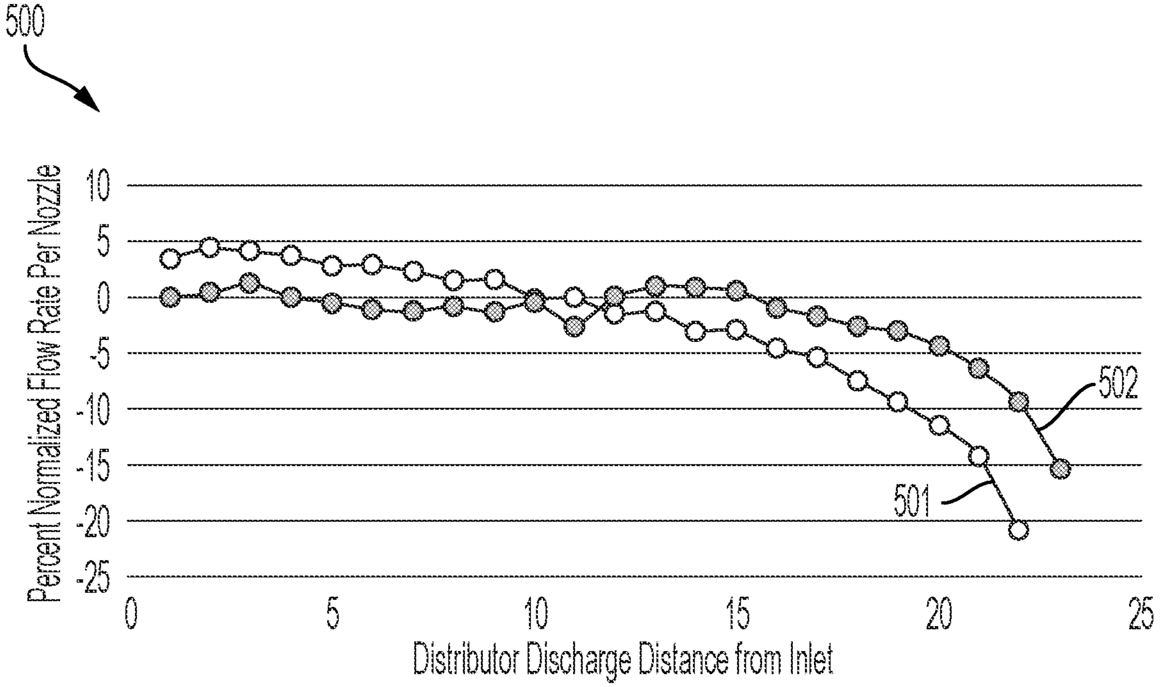
FIG. 5 is a graphical depiction of the normalized flow rate per chemical feed outlet as a function of chemical feed outlet distance from the chemical feed inlet along the chemical feed distributor in accordance with one or more embodiments of the present disclosure.

As shown in FIG. 5, the embodiments of the present disclosure, where the average cross-sectional area of the upstream fluid flow path portion 111 is greater than the average cross-sectional area of the downstream fluid flow path portion 112 (502 of FIG. 5), demonstrate a decreased flow maldistribution as compared to an embodiment where the average cross-sectional area of the upstream fluid flow path portion 111 is equal to the average cross-sectional area of the downstream fluid flow path portion 112 (501 of FIG. 5). In fact, the flow maldistribution of the present embodiments may be less than ±15.0%. Conversely, the flow maldistribution of an embodiment where the average cross-sectional area of the upstream fluid flow path portion 111 is equal to the average cross-sectional area of the downstream fluid flow path portion 112 may be as high as ±21.0%, as shown in FIG. 5.

EXAMPLES

The various embodiments of systems and processes for distributing a chemical feed through a chemical feed distributor will be further clarified by the following examples. The examples are illustrative in nature, and should not be understood to limit the subject matter of the present disclosure.

Example 1: Effect of an Average Cross-Sectional Area of the Upstream Fluid Flow Path Portion Greater than the Average Cross-Sectional Area of the Downstream Fluid Flow Path Portion In Example 1, a 3D computational fluid dynamics (CFD) model was used to compare a chemical feed distributor with an average cross-sectional area of the upstream fluid flow path portion that is greater than the average cross-sectional area of the downstream fluid flow path portion (hereinafter "Chemical Feed Distributor A") to a chemical feed distributor with a constant cross-sectional area along the upstream fluid flow path portion and the downstream fluid flow path portion (hereinafter "Chemical Feed Distributor B"). Both chemical feed distributors have a length of 100 inches. Further, both chemical feed distributors have 46 chemical feed outlets. A gas stream comprising methane, ethylene, and propylene was fed into the chemical feed distributors. The chemical feed distributors then directed the gas stream into a fluidized bed reactor operating at a temperature approximately 680° C. higher than the gas stream. Both chemical feed distributors have the same chemical feed stream inlet linear gas velocity of approximately 30-150 ft/sec with a normal inlet velocity of 60-80 ft/sec.

In Example 1, Chemical Feed Distributor A has an upstream fluid flow path portion with a diameter that is approximately double the diameter of the downstream fluid flow path portion. Conversely, Chemical Feed Distributor B has an upstream fluid flow path portion and the downstream fluid flow path portion with a constant diameter. Further, the last chemical feed outlet of Chemical Feed Distributor A is positioned 0.5 inches from the end of the chemical feed distributor. The last chemical feed outlet of Chemical Feed Distributor B is positioned 6.5 inches from the end of the chemical feed distributor.

Figure 3A:
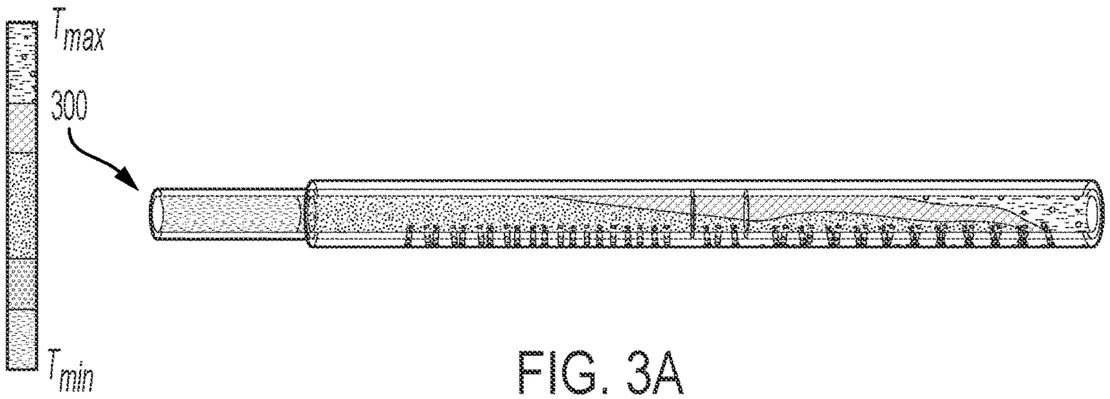
FIG. 3A is a schematic illustration of a model of the circumferential maximum surface temperature of the chemical feed distributor with a varying average cross-sectional area in accordance with one or more embodiments of the present disclosure.
Figure 3B:
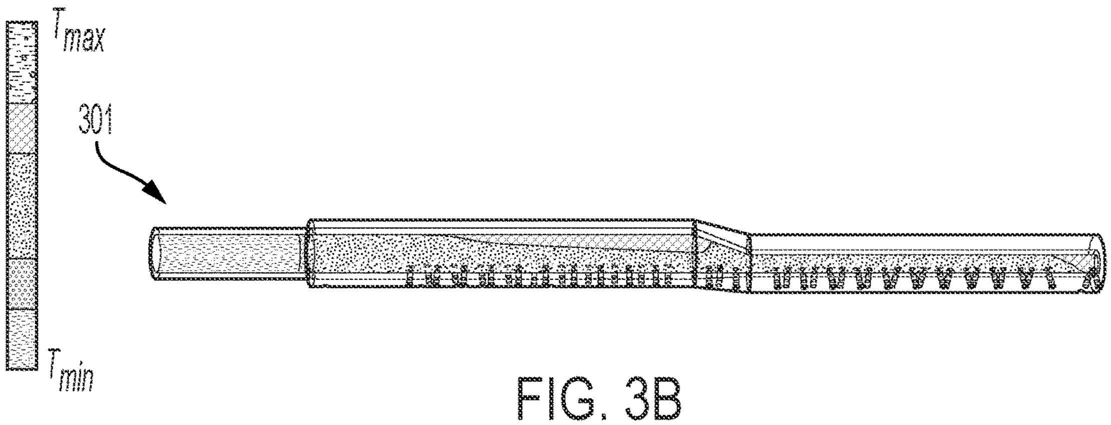
FIG. 3B is a schematic illustration of a model of the circumferential maximum surface temperature of the chemical feed distributor without a varying average cross-sectional area in accordance with one or more embodiments of the present disclosure.
Figure 4:
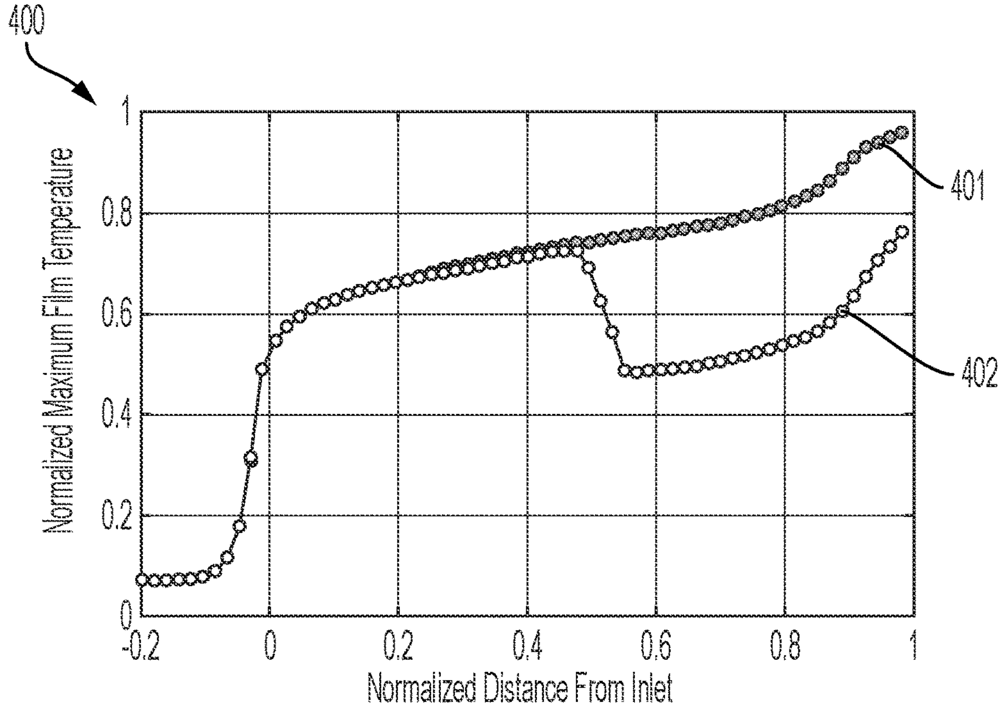
FIG. 4 is a graphical depiction of the peak temperature of a wall of a chemical feed distributor exposed to a chemical feed as a function of distance from the chemical feed inlet along the chemical feed distributor in accordance with one or more embodiments of the present disclosure.

As shown in FIGS. 3A and 3B, a chemical feed distributor with a constant cross-sectional area along the upstream fluid flow path portion and the downstream fluid flow path portion (FIG. 3A) is compared to an embodiment according the present disclosure where the average cross-sectional area of the upstream fluid flow path portion that is greater than the average cross-sectional area of the downstream fluid flow path portion (FIG. 3B). The circumferential maximum surface temperatures of the internal wall of the chemical feed distributors were obtained from the CFD model. Compared to the chemical feed distributor with a constant cross-sectional are along the upstream fluid flow path portion and the downstream fluid flow path portion, the chemical feed distributor where the average cross-sectional area of the upstream fluid flow path portion that is greater than the average cross-sectional area of the downstream fluid flow path portion demonstrates a lower circumferential maximum surface temperature.

As shown in FIG. 4, the end opposite the chemical feed inlet of the chemical feed distributor with a constant cross-sectional area along the upstream fluid flow path portion has a much higher circumferential maximum surface temperature than that of the chemical feed distributor where the average cross-sectional area of the upstream fluid flow path portion that is greater than the average cross-sectional area of the downstream fluid flow path portion. FIG. 4 demonstrates a lower and more uniform circumferential maximum surface temperature across the length of the chemical feed distributor where the average cross-sectional area of the upstream fluid flow path portion that is greater than the average cross-sectional area of the downstream fluid flow path portion (402), as compared to a chemical feed distributor where the cross-sectional area along the upstream fluid flow path portion and the downstream fluid flow path portion remains constant (401). Further, FIG. 4 demonstrates that the circumferential maximum surface temperature does not reach temperatures as high as an embodiment where the cross-sectional area along the upstream fluid flow path portion and the downstream fluid flow path portion remains constant (401). This lower circumferential maximum surface temperature may be due to the linear gas velocity of the chemical feed stream where average cross-sectional area of the upstream fluid flow path portion is greater than the average cross-sectional area of the downstream fluid flow path portion, as previously described herein. It will be apparent to those skilled in the art that the circumferential maximum surface temperature may be adjusted based on the process needs by tuning the feed stream, the inlet flow rate of the feed stream, the total length of the chemical feed stream flow path, the position of the chemical feed outlets, and the average cross-sectional areas of the upstream fluid flow path portion and downstream fluid path portion to reduce the risk of coking.

One or more aspect of the present disclosure are described herein. A first aspect may include a chemical feed distributor comprising: a chemical feed inlet that passes a chemical feed stream into the chemical feed distributor; and a body comprising one or more walls and a plurality of chemical feed outlets, wherein the one or more walls define an elongated chemical feed stream flow path, wherein the plurality of chemical feed outlets are spaced on the walls along at least a portion of the length of the elongated chemical feed stream flow path, and wherein the plurality of chemical feed outlets are operable to pass the chemical feed stream out of the chemical feed distributor and into a vessel; and wherein the elongated chemical feed stream flow path defined by the walls comprises an upstream fluid flow path portion along the first segment of the distance of the elongated chemical feed stream flow path starting from the chemical feed inlet and a downstream fluid flow path portion along the second segment of the distance of the elongated chemical feed stream flow path, and wherein the walls are positioned such that the average cross-sectional area of the upstream fluid flow path portion is greater than the average cross-sectional area of the downstream fluid flow path portion.

A second aspect may include the first aspect, wherein the minimum cross-sectional area of the elongated chemical feed stream flow path is less than 50% of the maximum cross-sectional area of the elongated chemical feed stream flow path.

A third aspect may include either the first or second aspect, wherein the chemical feed outlet that is most downstream relative to the elongated chemical feed stream flow path is positioned within two inches of an end wall defining a termination point of the elongated chemical feed stream flow path.

A fourth aspect may include any of the first through third aspects, wherein the chemical feed outlet that is most downstream relative to the elongated chemical feed stream flow path is positioned within a distance equal to the inner diameter of the elongated chemical feed stream flow path at the termination point of the elongated chemical feed stream flow path.

A fifth aspect may include any one of the first through fourth aspects, wherein the one or more walls comprise a first pipe, a frustum shaped transition section, and a second pipe, wherein the first pipe is in contact with the frustum shaped transition section and the frustum shaped transition section is in contact with the second pipe.

A sixth aspect may include the fifth aspect, wherein the center axis of the first pipe and the center axis of the second pipe are parallel.

A seventh aspect may include any one of the first through fourth aspects, wherein the one or more walls comprise a first wall and a second wall with an inner diameter larger than or equal to the first wall, wherein the second wall surrounds the first wall, wherein an interior surface of first wall defines the upstream fluid flow path portion, and wherein an exterior surface of the first wall and an interior surface of the second wall define the downstream fluid flow path portion.

An eighth aspect may include the seventh aspect, wherein the downstream portion of the elongated chemical feed stream flow path surrounds the upstream portion of the elongated chemical feed stream flow path.

A ninth aspect may include the seventh aspect, wherein the first wall comprises a first shaped pipe and the second wall comprises a second shaped pipe.

A tenth aspect may include any one of the first through fourth aspects, further comprising a chemical feed stream guide inside the body of the chemical feed distributor, wherein the chemical feed stream guide decreases the cross-sectional area along a portion of the elongated chemical feed stream flow path along the length of the chemical feed distributor.

An eleventh aspect may include the tenth aspect, wherein the average cross-sectional area of the chemical feed stream guide is greater in the downstream fluid flow path portion than in the upstream fluid flow path portion.

A twelfth aspect may include any one of the first through eleventh aspects, wherein the chemical feed distributor comprises a refractory material lining the walls of the body.

A thirteenth aspect may include any one of the first through twelfth aspects, wherein the thickness of refractory material lining the walls defining the downstream fluid flow path portion of the elongated chemical feed stream flow path is greater than the thickness of refractory material lining the walls defining the upstream fluid flow path portion of the elongated chemical feed stream flow path.

A fourteenth aspect may include a method for distributing a chemical feed, the method comprising: passing a chemical feed stream through a chemical feed inlet into a chemical feed distributor, wherein the chemical feed distributor comprises a body comprising one or more walls and a plurality of chemical feed outlets, wherein the one or more walls define an elongated chemical feed stream flow path, wherein the plurality of chemical feed outlets are spaced on the walls along at least a portion of the length of the elongated chemical feed stream flow path, wherein the elongated chemical feed stream flow path defined by the walls comprises an upstream fluid flow path portion along the first segment of the distance of the elongated chemical feed stream flow path starting from the chemical feed inlet and a downstream fluid flow path portion along the second segment of the distance of the chemical feed stream flow path, and wherein the walls are positioned such that the average cross-sectional area of the upstream fluid flow path portion is greater than the average cross-sectional area of the downstream fluid flow path portion; and passing the chemical feed stream along the elongated chemical feed stream flow path and out of the chemical feed distributor and into a vessel through the plurality of chemical feed outlets.

A fifteenth aspect may include the fourteenth aspect, wherein the temperature inside the vessel is greater than 650° C. and a circumferential maximum surface temperature of the chemical feed distributor does not exceed 650° C., and wherein a fluidized catalyst is present in the vessel.

Additionally, as shown in FIG. 5, in embodiments of the present disclosure, the flow rate per chemical feed outlet across the chemical feed distributor is much more stable. That is, when the average cross-sectional area of the upstream fluid flow path portion is greater than the average cross-sectional area of the downstream fluid flow path portion, the flow rate per chemical feed outlet is more uniform and consistent. As previously described herein, this reduced flow maldistribution may be attributable to reduced coking in the chemical feed distributor.

Finally, it will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

The invention claimed is:

1. A method for distributing a chemical feed, the method comprising:

passing a chemical feed stream through a chemical feed inlet into a chemical feed distributor, wherein the chemical feed stream is gaseous and the chemical feed distributor comprises a body comprising one or more walls and a plurality of chemical feed outlets, wherein the one or more walls define an elongated chemical feed stream flow path, wherein the plurality of chemical feed outlets are spaced on the one or more walls along at least a portion of the length of the elongated chemical feed stream flow path, wherein the elongated chemical feed stream flow path defined by the one or more walls comprises an upstream fluid flow path portion along a first segment of the distance of the elongated chemical feed stream flow path starting from the chemical feed inlet and a downstream fluid flow path portion along a second segment of the distance of the chemical feed stream flow path, and wherein the one or more walls are positioned such that an average cross-sectional area of the upstream fluid flow path portion is greater than an average cross-sectional area of the downstream fluid flow path portion; and passing the chemical feed stream along the elongated chemical feed stream flow path and out of the chemical feed distributor and into a vessel through the plurality of chemical feed outlets, wherein a temperature inside the vessel is greater than 650° C. and a circumferential maximum surface temperature of the chemical feed distributor does not exceed 650° C., and wherein a fluidized catalyst is present in the vessel.

2. The method of claim 1, wherein a minimum cross-sectional area of the elongated chemical feed stream flow path is less than 50% of a maximum cross-sectional area of the elongated chemical feed stream flow path.

3. The method of claim 1, wherein a chemical feed outlet that is most downstream relative to the elongated chemical feed stream flow path is positioned within two inches of an end wall defining a termination point of the elongated chemical feed stream flow path.

4. The method of claim 1, wherein a chemical feed outlet that is most downstream relative to the elongated chemical feed stream flow path is positioned within a distance equal to the inner diameter of the elongated chemical feed stream flow path at a termination point of the elongated chemical feed stream flow path.

5. The method of claim 1, wherein the one or more walls comprise a first pipe, a frustum shaped transition section, and a second pipe, wherein the first pipe is in contact with the frustum shaped transition section and the frustum shaped transition section is in contact with the second pipe.

6. The method of claim 5, wherein a center axis of the first pipe and a center axis of the second pipe are parallel.

7. The method of claim 1, wherein the one or more walls comprise a first wall and a second wall with an inner diameter larger than or equal to the first wall, wherein the second wall surrounds the first wall, wherein an interior surface of the first wall defines the upstream fluid flow path portion, and wherein an exterior surface of the first wall and an interior surface of the second wall define the downstream fluid flow path portion.

8. The method of claim 7, wherein the downstream portion of the elongated chemical feed stream flow path surrounds the upstream portion of the elongated chemical feed stream flow path.

9. The method of claim 7, wherein the first wall comprises a first shaped pipe and the second wall comprises a second shaped pipe.

10. The method of claim 1, further comprising a chemical feed stream guide inside the body of the chemical feed distributor, wherein the chemical feed stream guide decreases the cross-sectional area along a portion of the elongated chemical feed stream flow path along the length of the chemical feed distributor.

11. The method of claim 10, wherein the average cross-sectional area of the chemical feed stream guide is greater in the downstream fluid flow path portion than in the upstream fluid flow path portion.

12. The method of claim 1, wherein the chemical feed distributor comprises a refractory material lining the one or more walls of the body.

13. The method of claim 1, wherein a thickness of a refractory material lining the one or more walls defining the downstream fluid flow path portion of the elongated chemical feed stream flow path is greater than a thickness of a refractory material lining the one or more walls defining the upstream fluid flow path portion of the elongated chemical feed stream flow path.

* * * * *